(12) United States Patent
Harris et al.

(10) Patent No.: US 7,716,249 B2
(45) Date of Patent: May 11, 2010

(54) TRANSACTION AND TASK SCHEDULER

(75) Inventors: Tim L. Harris, Cambridge (GB); Simon Peyton-Jones, Cambridge (GB); Jonathan R. Howell, Seattle, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 11/229,053

(22) Filed: Sep. 16, 2005

(65) Prior Publication Data
US 2007/0073693 A1 Mar. 29, 2007

(51) Int. Cl.
G06F 7/00 (2006.01)
G06F 17/30 (2006.01)

(52) U.S. Cl. .................. 707/796; 707/764; 707/704; 711/1; 711/100; 711/145; 718/102; 718/104

(58) Field of Classification Search .................. 707/10, 707/3, 8; 711/1, 145; 718/102
See application file for complete search history.

(56) References Cited

U.S. PATENT DOCUMENTS

| | | | | |
|---|---|---|---|---|
| 5,524,241 A * | 6/1996 | Ghoneimy et al. | ............ | 707/10 |
| 5,872,981 A * | 2/1999 | Waddington et al. | ........ | 710/200 |
| 6,026,406 A * | 2/2000 | Huang et al. | ................ | 707/100 |
| 7,430,553 B2 | 9/2008 | Howell et al. | | |
| 2002/0124144 A1 * | 9/2002 | Gharachorloo et al. | ...... | 711/145 |
| 2003/0005233 A1 * | 1/2003 | Stewart et al. | .............. | 711/136 |
| 2003/0093418 A1 * | 5/2003 | Archbold et al. | ............... | 707/3 |
| 2004/0098721 A1 * | 5/2004 | Alverson et al. | ............. | 718/102 |
| 2004/0098723 A1 * | 5/2004 | Radovic et al. | ............. | 718/104 |
| 2005/0021898 A1 * | 1/2005 | Alverson et al. | ................ | 711/1 |
| 2005/0193232 A1 * | 9/2005 | Diehl | ............................ | 714/5 |
| 2005/0256822 A1 * | 11/2005 | Hollingsworth | ................ | 707/1 |
| 2006/0085588 A1 * | 4/2006 | Rajwar et al. | ............... | 711/100 |

OTHER PUBLICATIONS

Harris et al, "Composable Memory Transactions", ACM SIGPLAN Symposium on Principles and Practice of Parallel Programming, Jun. 2005, 13 pgs.

* cited by examiner

*Primary Examiner*—Tony Mahmoudi
*Assistant Examiner*—Dennis Truong
(74) *Attorney, Agent, or Firm*—Lee & Hayes, PLLC

(57) ABSTRACT

The described implementations relate to efficient scheduling of transactions and tasks. A memory location, address, or variable previously accessed by a blocked entity is observed periodically to determine an appropriate time to wake and retry the blocked entity. If the previous accessed memory location, address or variable changes state, a scheduler wakes the blocked entity and the blocked entity retries processing. A doubly-indexed data structure of blocked entities and memory locations associated with the blocked entities may be used to efficiently determine when a retrying execution would be profitable.

15 Claims, 10 Drawing Sheets

TRANSACTION AND TASK SCHEDULER

BACKGROUND

Multi-threaded software provides multiple execution "threads" which act like independently executing programs. An advantage of such multi-threaded software is that each thread may be executed in parallel for improved speed of execution. For example, a computer server for the Internet may use a multi-threaded server program where each separate client transaction runs as a separate thread. A thread may include one set of operations and then the thread is terminated. Such a thread may process these operations using a single transaction and then terminate. However, most threads include a plurality of operations that are carried out using individual transactions.

Threads may need to modify common data shared among the threads. For example, in an implementation of a transaction based system (e.g., a hotel reservation system), multiple threads handling transactions for different entities may read and write common data. If the threads are not coordinated in their use of the common data, serious errors can occur. For example, a first thread may read a variable and then change that variable based on the needs of the thread's client. It is expected that the change to the variable will be visible to the other threads modifying common data of the transaction based system. However, if a second thread reads the same variable prior to the change by the first thread, the second thread may, based on that read, erroneously change that variable again, which results in inconsistent and erroneous common data of the transaction based system.

To avoid these problems, it is common to use synchronizing instructions to delineate portions of a thread (often called critical sections), where simultaneous execution by more than one thread might be a problem. A common set of synchronizing instructions implement a lock, using a lock variable having one value indicating that it is "held" by a thread and another value indicating that it is available. A thread or transaction of the thread must acquire the lock before executing the critical section and does so by reading the lock variable and if the lock variable is not held by another thread, writing a value to the lock variable indicating that it is held. When the critical section is complete, the thread writes to the lock variable a value indicating that the lock is available again or "free".

Typically, the instructions used to acquire the lock are "atomic instructions", that is, instructions that cannot be interrupted once begun by any other thread or quasi-atomic instructions that can be interrupted by another thread, but that make such interruption evident to the interrupted thread so that the instructions can be repeated.

While the mechanism of locking a critical section for use by a single thread, or a transaction of that thread, effectively solves conflict problems, that is, where two threads need to access a variable and at least one is writing, it can reduce the benefits of parallel execution of threads by forcibly serializing the threads as they wait for a lock. This serialization can be reduced by using a number of different locks associated, for example, with different small portions of shared memory. In this way, the chance of different threads waiting for a lock on a given portion of shared memory is reduced.

However, the use of multiple locks generally increases the complexity of the programming process and thus creates a tradeoff between program performance and program development time. Moreover, multiple locks or fine-grained locks may themselves cause performance problems, since managing the locks generally consumes a large amount of time.

Threads or transactions that attempt to acquire a variable, address, or memory location that is currently locked by another process are "blocked". When a thread or transaction blocks, its processing is halted. Blocked threads or transactions are generally restarted or woken after a period of inactive time. For example, a thread management module may simply "wake" locked threads or transactions after a predetermined lapse of time. This allows the blocked thread or transaction to reattempt their processing requirements. If the variable, address, or memory location that is required by the woken thread or transaction is still locked, the thread or transaction blocks again and waits for an instruction to wake again.

A thread management module may wake the blocked threads or transactions using a round-robin process. A queue may be used for this purpose, where blocked threads or transactions are added to the queue and processed therefrom in turn. Blocked threads or transactions in the queue are selected from a head of the queue by the thread management module. The selected threads or transactions attempt to access relevant memory, and if successful, will commit. Those threads or transactions that encounter a lock are blocked again and placed back in the queue.

Another synchronization mechanism, which makes use of a "condition variable," may be used for resolving data dependencies between threads, or thread transactions. The condition variable is a mechanism by which a thread blocks until an arbitrary condition has been satisfied. Another thread that makes the condition true is responsible for unblocking the waiting thread.

Functionally, the current management techniques for blocked threads achieve the necessary result of ensuring blocked threads or transactions are repeated until they are property processed and committed. However, significant processing may be wasted to achieve those results. In particular, the current management techniques often repeat blocked threads or transactions without ascertaining if there is a high likelihood that the repeated threads or transactions will process successfully. Furthermore, current management techniques generally require developers to establish explicit synchronization relationships for threads or transactions that have blocked. Establishing these explicit synchronization relationships is time consuming; moreover, intrinsic synchronization relationships cause application inefficiencies.

An additional problem with the current management techniques is that they generally require explicit programming in application program code. For example, in the case of locks, a developer must generally write instructions into the application program's code to acquire a lock before entering a specific critical section, and to release the lock when execution in the critical section is complete. This greatly complicates the programming task.

SUMMARY

Implementations described herein relate to efficient retrying of blocked entities. Such blocked entries include threads, thread transactions and tasks.

A transaction may block when the transaction encounters a memory address that is unavailable, or a variable therein that is unexpected. An implementation described herein handles such a blocked transaction in a unique manner. Instead of randomly trying to reprocess the blocked transaction from time-to-time, an implementation described (retry) herein monitors a previously accessed object (e.g., a memory address) that caused the entity to block. Once the object undergoes some kind of change, the blocked transaction is woken and allowed to retry. The described methodology helps to reduce the likelihood that a retried transaction will block more than once. Moreover, from the program development standpoint, the use of a simple retry instruction greatly simplifies a programming development process of an application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Overview

Systems and methods for handling blocked transactions and tasks are described. In the following, a broad discussion of retrying one or more blocked transaction in consideration of a previous address accessed by the blocked transaction is provided. This discussion will make use of an exemplary computing device illustrated in FIG. 1, as well as various components of the computing device and contents therein. Another implementation described herein makes use of a doubly-indexed data structure for determining when blocked transactions should retry. In one implementation, the data structure is split into two data structures, where each of the two data structures includes an index searchable by a scheduler. When a transaction commits, the scheduler searches each of the indexes to determine if it is appropriate to allow a blocked transaction to retry. One index includes references to blocked transactions and the other index includes the memory addresses that the blocked transactions accessed before they blocked.

Exemplary System

Figure 1:
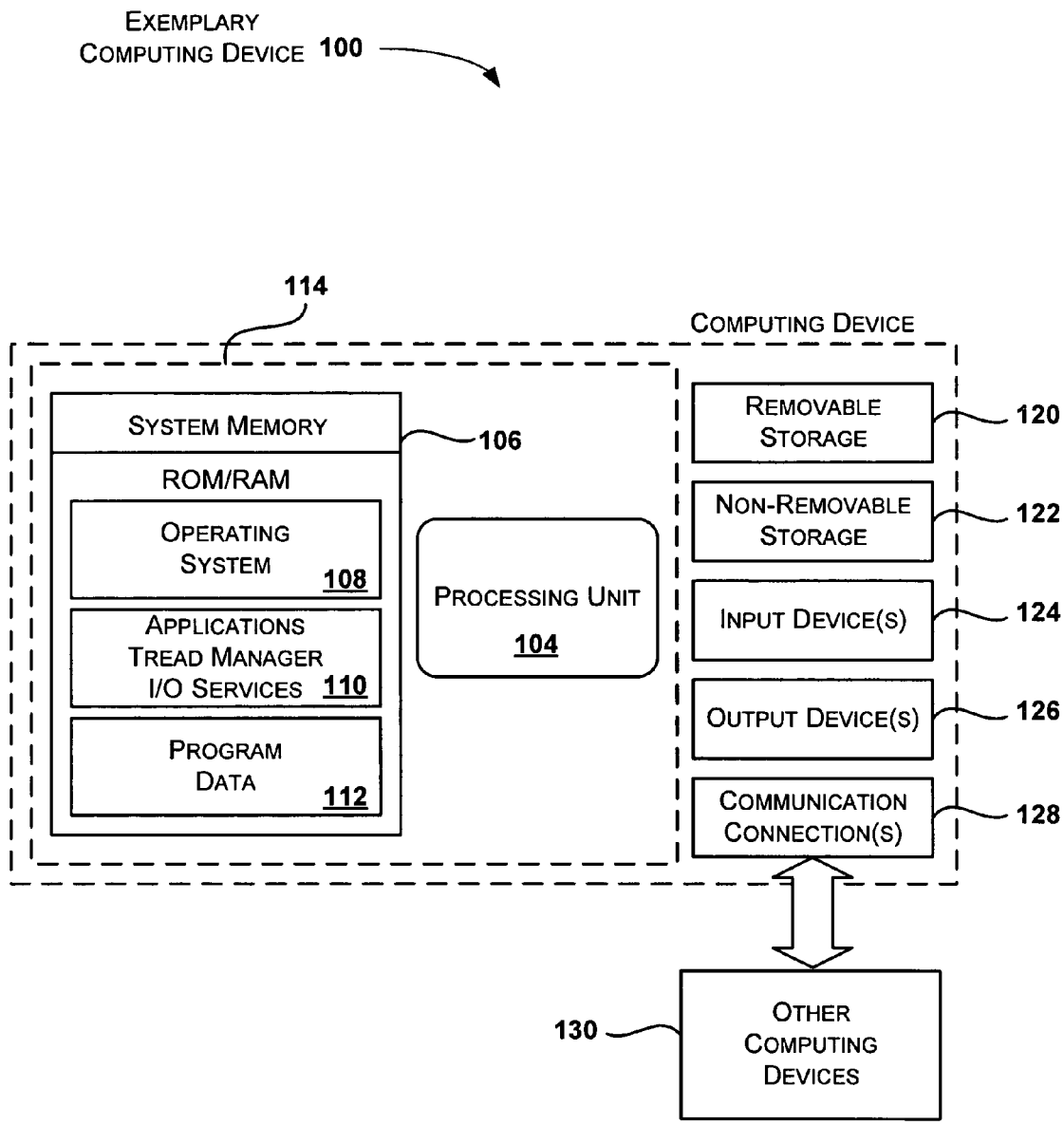
FIG. 1 is an illustrative computing device that may be used to implement exemplary embodiments described herein.

FIG. 1 is an illustrative computing device 100 that may be used to implement exemplary embodiments described herein. In a very basic configuration, the computing device 100 includes at least one processing unit 104 and a system memory 106. Depending on the exact configuration and type of the computing device 100, the system memory 106 may be volatile (such as RAM), non-volatile (such as ROM, flash memory, etc.) or some combination of the two. The system memory 106 typically includes an operating system 108, one or more program modules or applications 110, and may include program data 112.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by a removable storage 120 and a non-removable storage 122. Computer storage media may include volatile and nonvolatile, removable and non-removable media implemented in any method or technology for storage of information, such as computer readable instructions, data structures, program modules, or other data. The system memory 106, removable storage 120 and the non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 100. Any such computer storage media may be part of the device 100. The computing device 100 may also have an input device(s) 124 such as keyboard, mouse, pen, voice input device, touch input device, etc. An output device(s) 126 such as a display, speakers, printer, etc. may also be included. These devices are well know in the art and need not be discussed at length.

The computing device 100 may also contain a communication connection 128 that allow the device to communicate with other computing devices 130, such as over a network (e.g. the Internet). The communication connection(s) 128 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
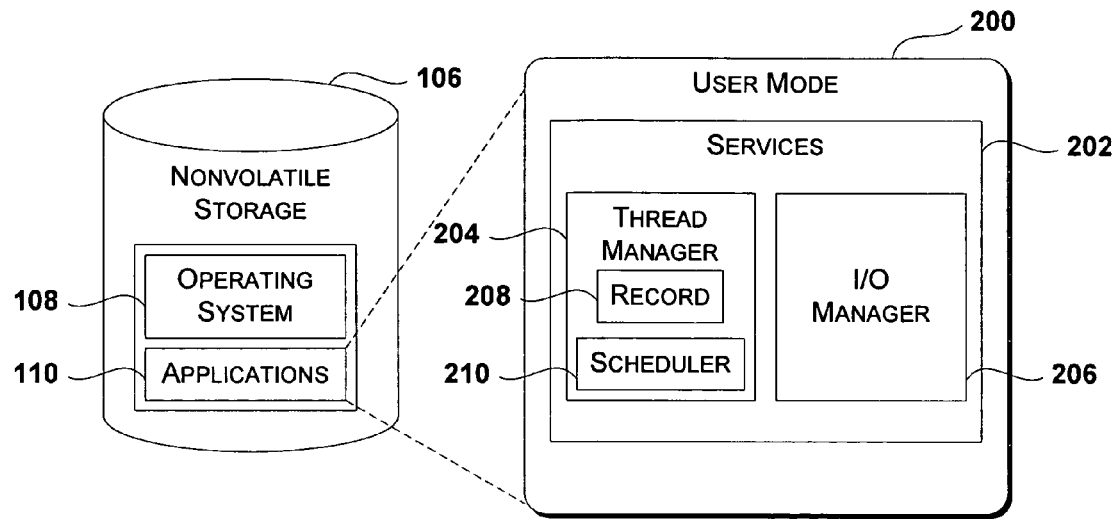
FIG. 2 illustrates exemplary contents of a nonvolatile storage of the computing device illustrated in FIG. 1.

FIG. 2 illustrates exemplary contents of the nonvolatile storage 106 of the computing device 100. The nonvolatile storage 106 includes the operating system 108 and the applications 110. Other data may be stored in the nonvolatile storage 106 as well.

The operating system 108 is generally divided into two parts: a "kernel mode" (not illustrated) and a "user mode" 200. The user mode 200 is a non-privileged processor mode in which subsystems and services of the operating system 108 and applications 110 and/or clients run. Therefore, in FIG. 2, the user mode 200 is illustrated as being appropriately associated with the applications 110. Both the kernel mode and the user mode 200 have access to system data.

The user mode 200 implements various services 202 including, for example, a thread manager 204 and an input/output (I/O) manager 206. The thread manager 204 may include a memory address record 208 and a scheduler 210. The record 208 and the scheduler 210 are discussed in detail later. The user mode 200 may also include various memory services, process creation services, and/or processor scheduling services. The services 202 are used by the applications 110 when certain operations are required by a requesting one of the applications 110. For example, one of the applications 110 may require I/O services. If such is the case, the requesting one of the applications 110 will send a message to the I/O manager 206 that requests I/O services. The I/O manager 206 uses one or more processes or threads to handle the I/O services requested in the received message. The processes or threads are passed to the thread manager 204, which handles the scheduling and execution of the threads. As is readily appreciated, the thread manager 204 may schedule and execute threads serially or in parallel, using one or more processors 104 illustrated in FIG. 1. Although various implementations described herein make reference to the services 202 related to the user mode 200, this is done by way of example only. That is, other computer implemented services may be administered by the described various implementations.

Generally, a thread is an entity that a service, such as the I/O manager 206, uses to process a request made of that service. Each thread may have an associated context, manifest as volatile data associated with the execution of the tread. Thus, a thread's context generally includes a reference to the volatile data as well as an address location or plurality of address locations where the volatile data is to be put and or written, or the address location or plurality of address locations from where the volatile data is to be read or retrieved.

Figure 3:
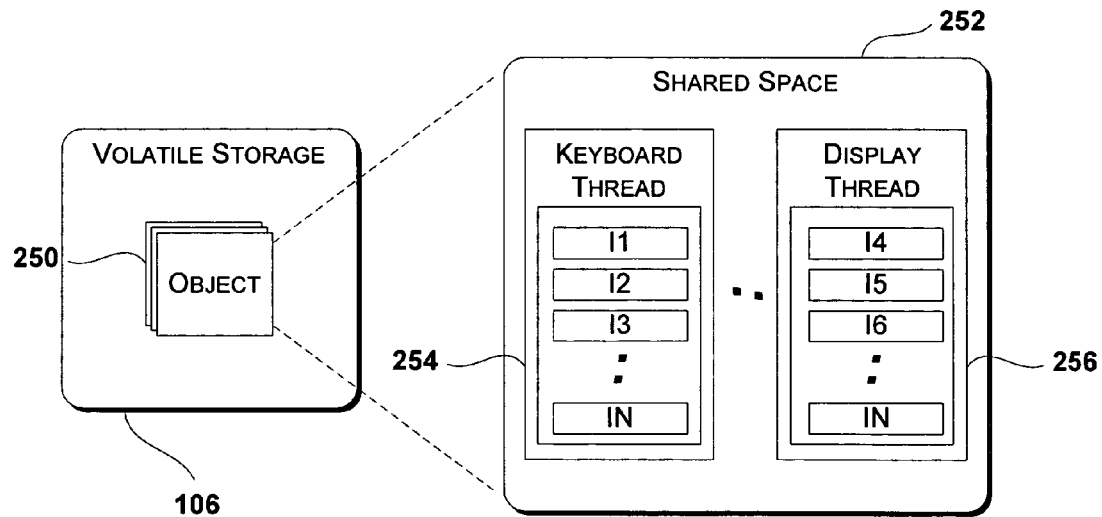
FIG. 3 illustrates exemplary contents of a volatile storage of the computing device illustrated in FIG. 1.

FIG. 3 illustrates exemplary contents of the volatile storage 106 of the computing device 100. The volatile storage 106 includes a plurality of objects 250 that are sharing an amount of memory provided by the volatile storage 106. This memory is shown in the figure as a shared space (memory) 252.

For discussion purposes, suppose the shared space 252 includes at least a keyboard thread 254 and a display thread 256, as illustrated in FIG. 3. The threads 254 and 256 were initiated by the I/O manager 206 and are being handled by the thread manager 204. The keyboard thread 254 includes a number of items I1-IN, being handled by one or more transactions of the thread 254, that are for display on an output device 126 (e.g., a display) of the computing device 100. Each of these items I1-IN is associated with at least one memory address of the shared space 252, using such transactions of the keyboard thread 254. The display thread 256 includes a number of items I4-IN, being handled by one or more transactions of the thread 256, that are intended for display on the output device 126. These items I4-IN may be retrieved, using such transactions, from memory addresses that have been written to by the keyboard thread 254.

Conventional thread management processes would implement a locking scheme to help ensure that addresses being written to by the keyboard thread 254 are not accessed by the display thread 256 before the writes by the keyboard thread 254 are committed. The exemplary implementations described in conjunction with FIGS. 4-11 describe various technologies that eliminate the need to use a locking scheme to help maintain data consistency. The same technologies provide an improved process for handing threads or transactions that encounter locks and are thus blocked. Advantageously, the exemplary implementations described in conjunction with FIGS. 4-11 substantially eliminate many of the disadvantages related to conventional thread management processes that use locking schemes to help maintain memory/address consistency.

Exemplary Retry of Blocked Transaction

Figure 4:
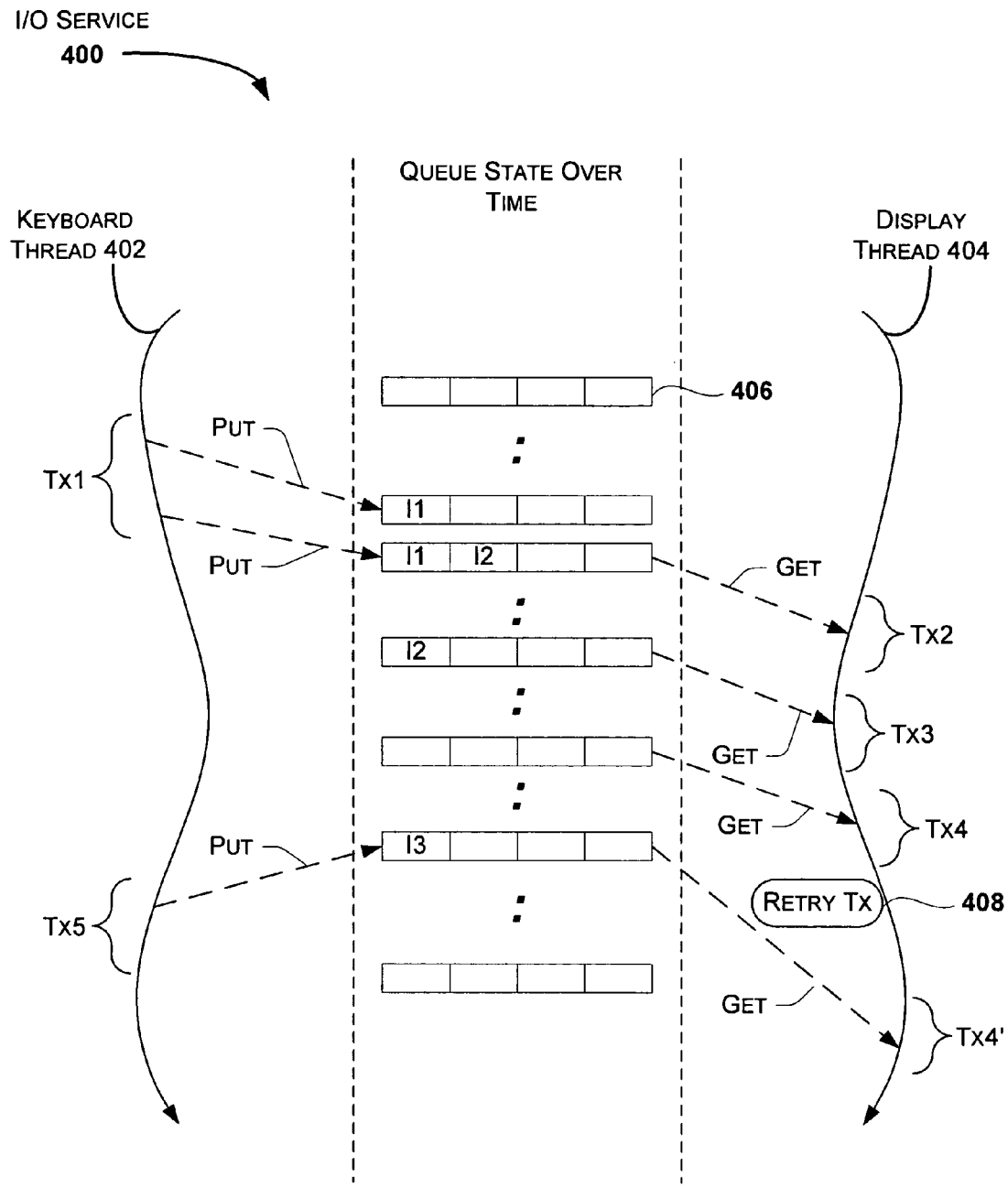
FIG. 4 illustrates an exemplary I/O service that includes a keyboard thread and a display thread that are interacting with a queue.

FIG. 4 illustrates an I/O service 400 that includes a keyboard thread 402 and a display thread 404 that are interacting with a queue 406. The queue 406 is shown in FIG. 4 in various states, over time, as the keyboard thread 402 and the display thread 404 interact with the queue 406. Time is represented vertically in FIG. 4, with events occurring in time order from top to bottom.

The threads 402 and 404 both perform transactions that affect the queue 406. In general, the term transaction is used herein to describe events performed by a thread that affect or touch at least one memory location in a volatile/nonvolatile memory (e.g., volatile storage 106). For example, transactions Tx1 and Tx5 of the keyboard thread 402 perform put operations to the queue 406, while transactions Tx2-Tx4 of the display thread 404 perform get operations from the queue 406.

Referring to FIG. 4, the transaction Tx1 of the keyboard thread 402 performs two put operations. The first put operation adds an item I1 to the head of the queue 406. The second put operation of the transaction Tx1 adds an item I2 to the next position in the queue 406. Once the transaction Tx1 performs the two put operations, the transaction Tx1 commits and the thread manager 204 updates the record 208, described in further detail below as a transactional record, which tracks those addresses of the queue implementation that have been affected by committed transactions. These addresses will be described in detail below with reference to FIG. 5. The thread manager 204 updates the record 208 only after a given transaction commits.

The transaction Tx2 processed by the display thread 404 is used to get an item that is at the head of the queue 406. Therefore, the transaction Tx2 will get the item I1 from the queue 406 and subsequently commit. Once again, the thread manager 204 records in record 208 those addresses that have been affected by the committed transaction.

Subsequently, the display thread 404 processes the transaction Tx3. Similar to the transaction Tx2, the transaction Tx3 gets item I2 from the queue and then commits. This leaves the queue 406 empty. The record 208 of the thread manager 204 is updated to reflect the change to the addresses in the implementing memory.

The display thread 404 attempts to retrieve an item from the queue 406 using the transaction Tx4. Recognizing that the queue 406 is empty, the transaction Tx4 blocks. The thread manager 204 detects that the transaction Tx4 has blocked and stores a reference to the blocked transaction Tx4.

Retries of blocked transactions are handled by the scheduler 210 of the thread manager 204. Therefore, the scheduler 210 references the record 208 to see if any of the addresses accessed by blocked transaction Tx4 have changed. If the scheduler 210 observes a transaction commit that changes such an address, the scheduler 210 will instruct the transaction Tx4 to retry. The restarted transaction is shown in FIG. 4 as a transaction Tx4'. The transaction Tx4' gets the item I3 from the queue 406 and commits. Once again, the thread manager 204 updates the record 208 to reflect those implementing memory addresses that have been affected by the committed transaction.

Figure 5:
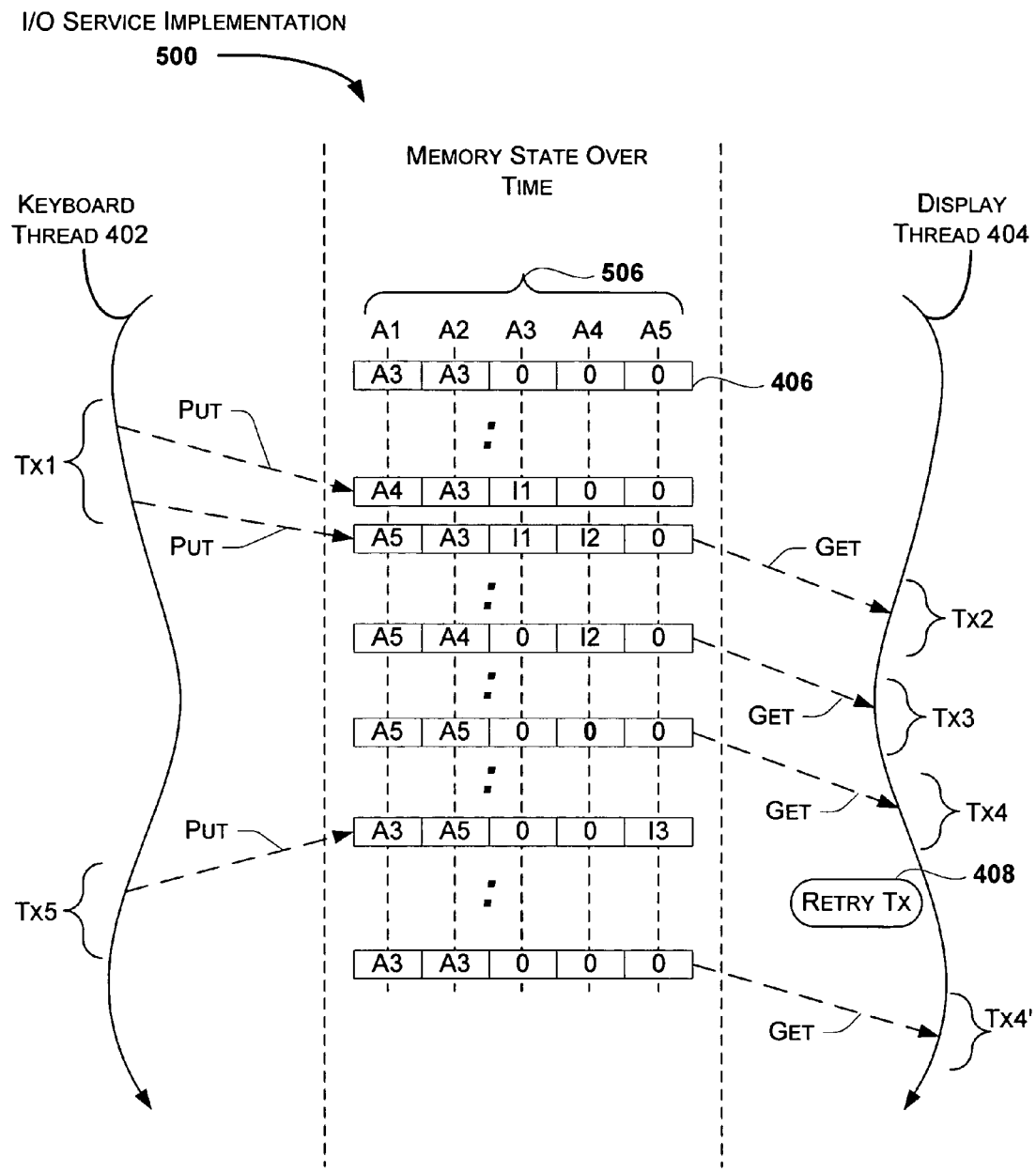
FIG. 5 illustrates an exemplary I/O service that includes a keyboard thread and a display thread that are interacting with the memory that implements a queue.

FIG. 5 illustrates an implementation an I/O service implementation 500. Memory locations 506 implement the queue 406, and are shown in FIG. 5 in states corresponding to those in FIG. 4. Time is represented vertically in FIG. 5, with events occurring in time order from top to bottom.

The memory locations 506 have addresses A1 through A5. In the illustration of FIG. 5, these addresses implement queue 406 as follows. The memory location A1 is designated as a tail pointer that stores the address of a memory location that implements the tail of the queue. The memory location A2 is designated as a head pointer that stores the address of a memory location that implements the head of the queue. The remaining three memory locations A3 through A5 store items in the queue or zeroes when they are unused. The head and tail pointers are adjusted as the queue is filled and drained.

When a transaction performs a put operation on the queue 406, the implementation of this transaction performs read and write operations to the memory addresses 506. Specifically, a put operation first checks to ensure that the queue 406 is not full, which requires reading the tail pointer A1 and the head pointer A2. The put operation then writes an item into a memory location indicated by an address stored in the memory location A1. Lastly, the put operation updates the address stored in the tail pointer A1.

Similarly, when a transaction performs a get operation on the queue, the implementation of this transaction performs read and write operations to the memory addresses 506. Specifically, a get operation first checks to ensure that the queue 406 is not empty, which requires reading the tail pointer A1 and the head pointer A2. The get operation then reads an item from a memory location indicated by an address stored in the memory location A2. Lastly, the get operation zeroes the memory location indicated by the address stored in the memory location A2, and it updates the address stored in the head pointer A2.

Referring to FIG. 5, a transaction Tx1 of the keyboard thread 402 performs two put operations. The first put operation adds an item I1 to the head of the queue. It does this by reading the tail and head pointers A1 and A2 to ensure that there is space in the queue; it then writes item I1 to location A3, as indicated by the tail pointer A1; and it then increments the tail pointer A1 to point to the memory location A4. The second put operation of the transaction Tx1 adds an item I2 to the next position in the queue 406. It does this by reading the tail and head pointers A1 and A2 to ensure that there is space in the queue 406; it then writes the item 12 to the memory location A4, as indicated by the tail pointer A1; and it then increments the tail pointer A1 to point to the memory location A5.

Once the transaction Tx1 performs the two put operations, the transaction Tx1 commits and the thread manager 204 updates the record 208, described in further detail below as a transactional record, which tracks those addresses of the queue 406 implementation that have been affected by committed transactions. As described above, the addresses A1 and A2 were read, and the addresses A1, A3, and A4 were written. The thread manager 204 updates the record 208 only after a given transaction commits.

A transaction Tx2 processed by the display thread 404 attempts to get an item from the tail of the queue 406. It does this by reading the tail and head pointers A1 and A2 to ensure that the queue 406 is non-empty; it then reads the item I1 from the memory location A3, as indicated by the head pointer A1; and it then zeroes the memory location A3 and increments the head pointer A1 to point to the memory location A4. After the transaction Tx2 gets the item I1, it subsequently commits. Once again, the thread manager 204 records in the record 208 those addresses that have been affected by the committed transaction. As described above, the addresses A1, A2, and A3 were read, and the addresses A2 and A3 were written.

Subsequently, the display thread 404 processes a transaction Tx3. Similar to the transaction Tx2, the transaction Tx3 gets item I2 from the queue and then commits, leaving the queue empty. This transaction involves reading addresses A1, A2, and A4, and it involves writing addresses A2 and A4. The record 208 of the thread manager 204 is updated to reflect the change to the addresses.

The display thread 404 attempts to retrieve an item from the queue 406 using a transaction Tx4. The transaction Tx4 first reads the tail and head pointers A1 and A2. The transaction Tx4 observes that the address values A5 and A5, stored by the head and tail pointers A1 and A2, are the same, which indicates that the queue 406 is empty. The transaction Tx4 therefore blocks. The thread manager 204 detects that the transaction Tx4 has blocked and stores a reference to the blocked transaction Tx4.

In consideration of the above, the following will describe how retries of blocked transactions are handled by the scheduler 210 of the thread manager 204. The scheduler 210 references the record 208 to see if any of the addresses read by blocked transaction Tx4 have changed. As described above, the transaction Tx4 read addresses A1 and A2. When the scheduler 210 observes that a transaction Tx5 has committed, thereby writing addresses A1 and A5, the scheduler 210 will instruct the transaction Tx4 to retry. The restarted transaction is shown in FIG. 5 as a transaction Tx4'.

The transaction Tx4' gets the item I3 from the queue 406 and commits. It does this by reading the tail and head pointers A1 and A2 to ensure that the queue 406 is non-empty; it then reads an item I3 (added by the transaction Tx5) from the memory location A5, as indicated by the head pointer A2; and it then zeroes the memory location A5 and updates the head pointer A2 to point to the memory location A3. Once again, the thread manager 204 records in the record 208 those addresses that have been affected by the committed transaction. As described above, the addresses A1, A2, and A5 were read, and the addresses A2 and A5 were written.

The foregoing process of managing thread transactions is very efficient in insuring that blocked transactions do not unnecessarily resume processing until data, or other such information, a given blocked transaction requires is available. However, efficiencies may be improved, as will be understood from the following description that is aided by FIG. 6-11.

Figure 6:
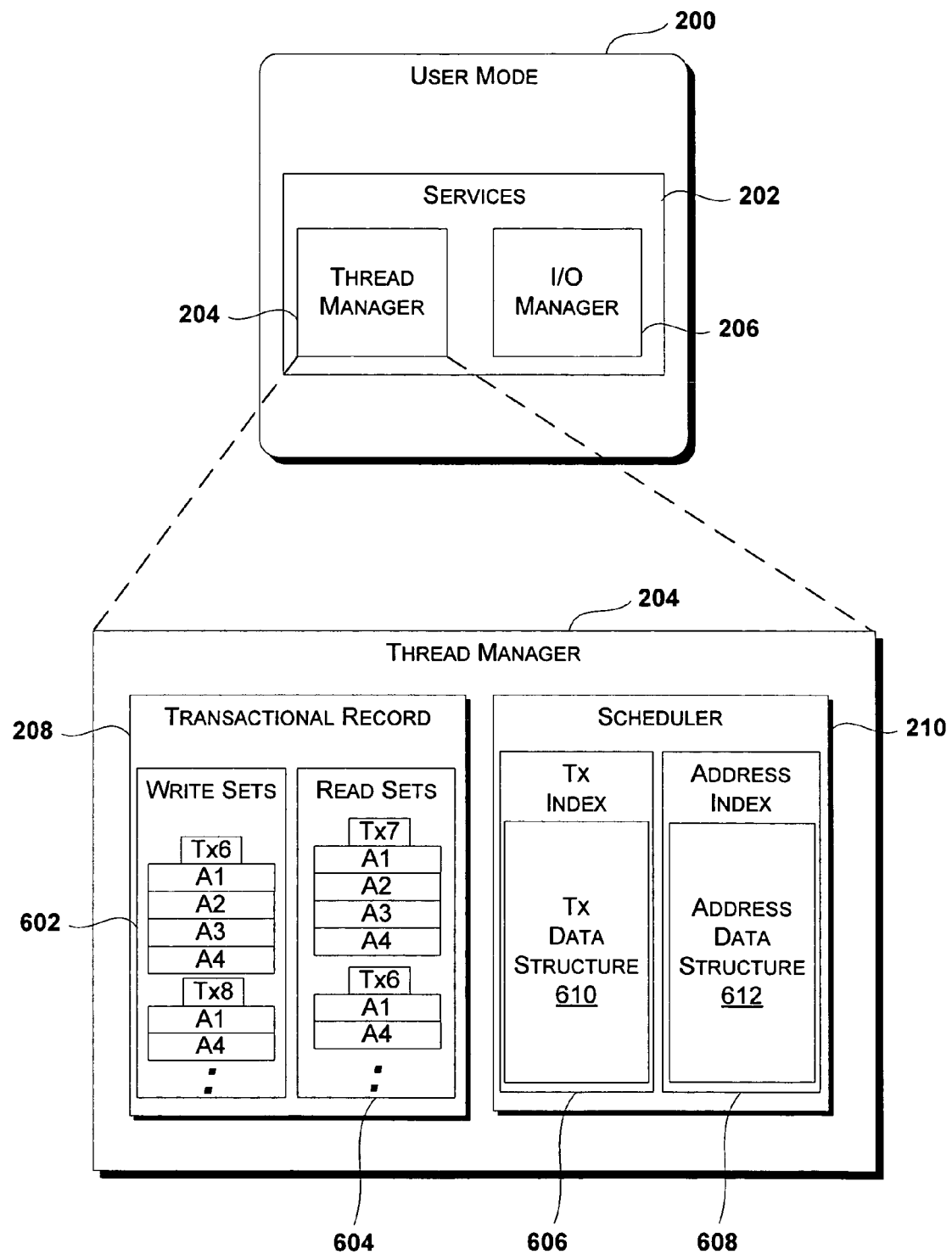
FIG. 6 illustrates an exemplary implementation of a thread manager.

FIG. 6 illustrates an exemplary implementation of the thread manager 204. The thread manager 204 includes the transactional record 208 and the scheduler 210. The transactional record 208 includes a write set accumulator 602 and a read set accumulator 604. The scheduler 210 includes a transaction index 606 and an address index 608. The transaction index 606 holds a transaction data structure 610 and the address index 608 holds an address data structure 612.

The thread manager 204 keeps track of the various transactions Tx1-TxN that the various keyboard threads 502 and display threads 504 are executing. As a transaction executes, the thread manager 204 observes the transaction's writes and accumulates them in the appropriate write set 602, and observes the transaction's reads and accumulates them in the appropriate read set 604.

When a transaction blocks, the thread manager 204 removes the transaction's read and write sets from the transactional record 208, and the scheduler 210 updates the transaction data structure 610 and the address data structure 612 with the contents of the transaction's read set.

When a transaction commits, the thread manager 204 removes the transaction's read and write sets from the transactional record 208, and the scheduler 210 identifies which blocked transactions' read sets share an address with the committed transaction's write set. These identified blocked transactions are removed from the transaction data structure 610 and address data structure 612, and the identified blocked transactions are scheduled for execution.

Figure 7:
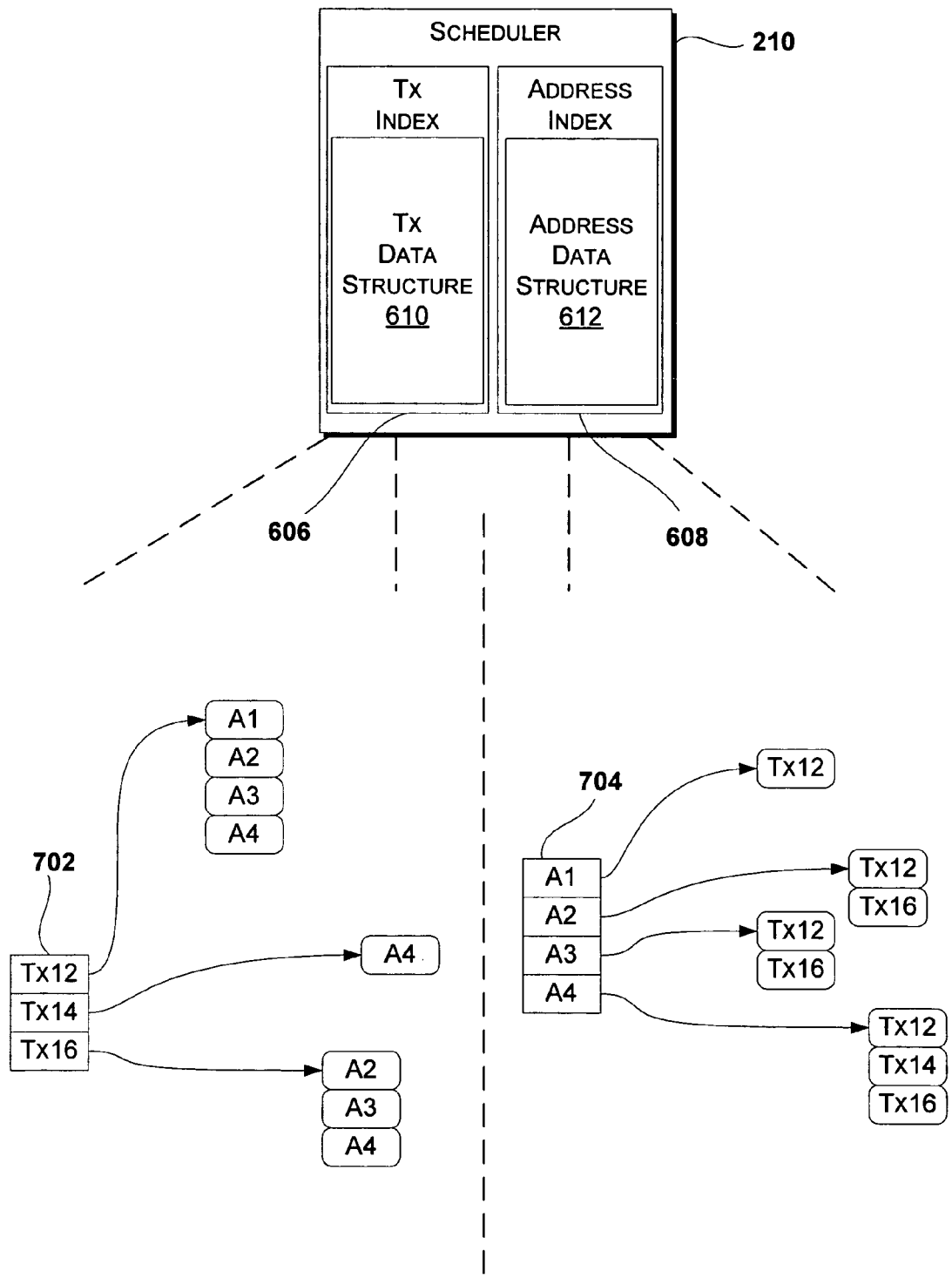
FIG. 7 illustrates exemplary data structures held by a transaction index and an address index, respectively.
Figure 8:
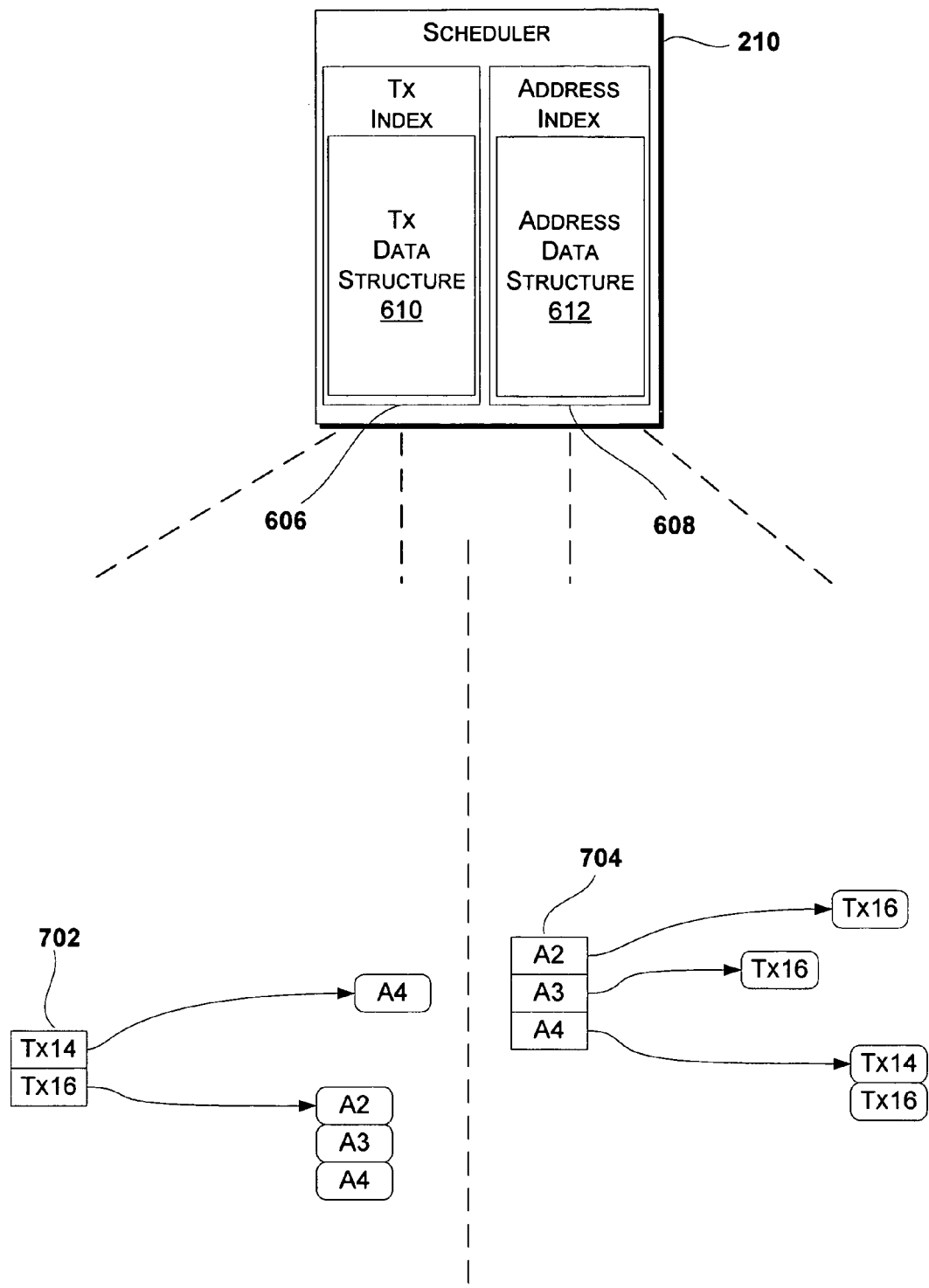
FIG. 8 illustrates exemplary data structures held by the transaction index and the address index, respectively, but after a transaction finishes processing and thus commits.

FIGS. 7 and 8 will now be referenced in detail to demonstrate how the thread manager 204, in concert with the scheduler 210, determines when a blocked transaction should be woken and retried. FIG. 7 illustrates the data structures 610 and 612 held by the transaction index 606 and the address index 608, respectively, at some point when transactions Tx12, Tx14, and Tx16 are blocked. FIG. 8 illustrates the data structures 610 and 612 held by the transaction index 606 and the address index 608, respectively, at a later point after some transaction Tx13 commits, having written addresses A1 and A5.

The data structure 610 illustrated in FIG. 7 includes a blocked transaction index 702. In this case, the blocked transaction index 702 includes the blocked transactions Tx12, Tx14, and Tx16. The manner in which these transactions Tx12, Tx14, and Tx16 reached the blocked state is similar to the manner in which Tx4 reached the block state as discussed in detail in connection with FIGS. 4 and 5. Each of the indexed blocked transactions Tx12, Tx14, and Tx16 includes a reference to the addresses the respective blocked transaction was attempting to access before the transaction blocked. For example, the blocked transaction Tx12 includes a reference to the addresses A1-A4.

The data structure 612 illustrated in FIG. 7 includes an accessed address index 704. In this case, the accessed address index 704 includes the accessed addresses A1-A4 and the various transactions that read those addresses A1-A4 and encountered a blocking condition. For example, the address A2 includes references to transactions Tx12 and Tx16.

The scheduler uses indexes 702 and 704 when a transaction commits to efficiently determine which, if any, blocked transactions should be woken and retried. FIG. 8 illustrates the structure of the data structures 610 and 612 after the transaction Tx13 commits, having written addresses A1 and A5. The thread manager 204 removes the read and write sets of the transaction Tx13 from the transactional record 208, and the scheduler 210 looks up the addresses A1 and A5 in the address data structure 612, thereby learning that transaction Tx12 should be retried. The scheduler 210 then uses the transaction data structure 610 to efficiently determine the set of addresses (A1, A2, A3, and A4) in the read set of blocked transaction Tx12. For each address, the scheduler 210 indexes into the address data structure 612 to remove dangling references to Tx12.

The result of these steps is shown in FIG. 8. In particular, the blocked transaction index 702 no longer includes a reference to the transaction Tx12. Similarly, none of the addresses in accessed address index 704 refer to transaction Tx12. Because no blocked transactions are waiting on address A1, it is removed from the accessed address index 704.

The use of index 704 allows the scheduler 210 to quickly identify which blocked transactions should be woken, if any, after a transaction commits. The use of index 702 allows the scheduler 210 to efficiently maintain index 704.

Exemplary Processes

Figure 9:
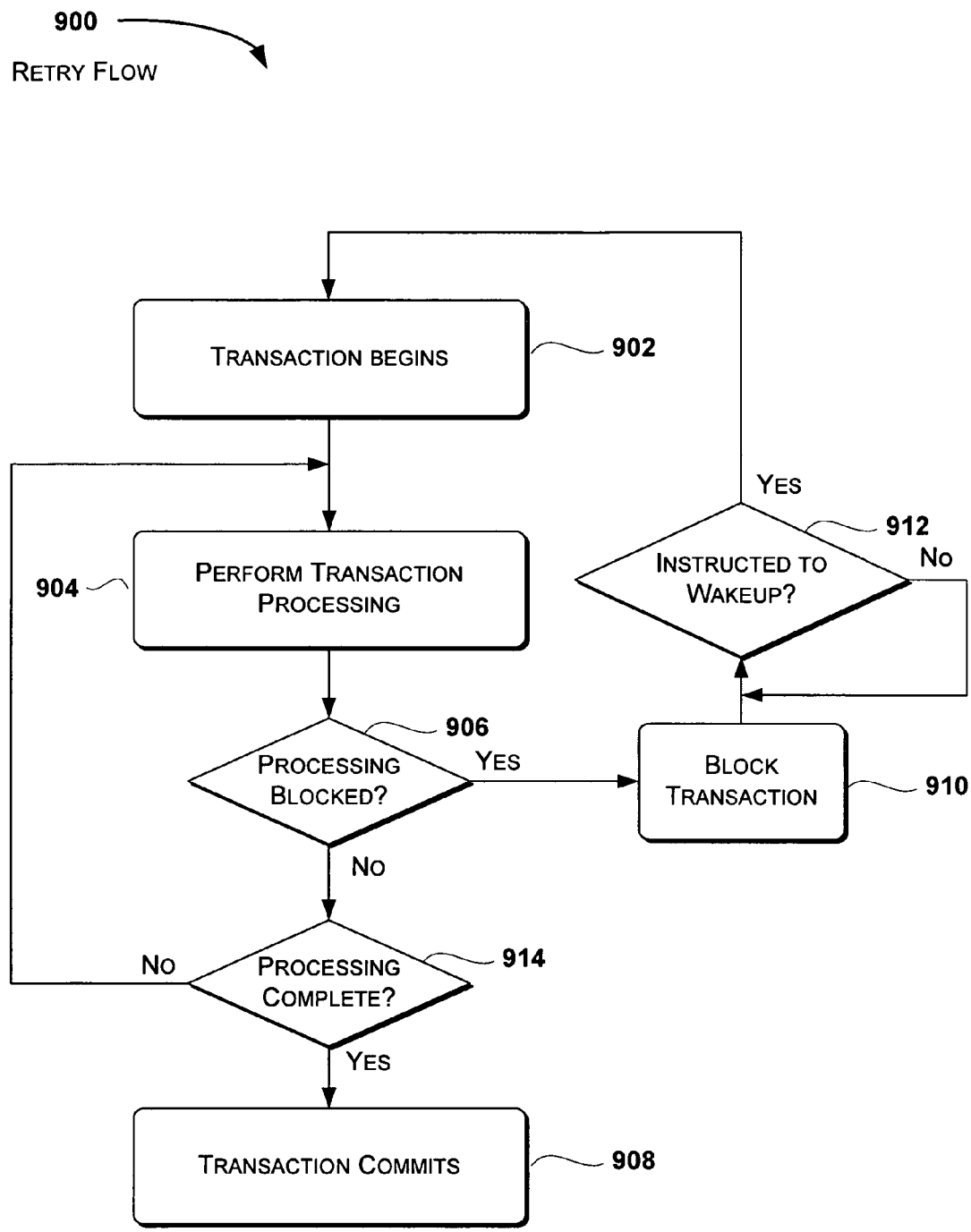
FIG. 9 is a flow diagram illustrating an exemplary implementation of retrying a blocked thread or transaction.

FIG. 9 is a flow diagram illustrating an exemplary implementation 900 of retrying a blocked thread or transaction. The exemplary process illustrated in FIG. 9 may be implemented using any suitable computing device, such as the computing device 100 illustrated in FIG. 1 and the various components illustrated in FIGS. 2-3.

At 902, a thread's transaction has started. The transaction then attempts to perform processing (904). This processing may include reading or writing memory. The program being executed by the thread may indicate that it must block (906). In the absence of a need to block, the program may indicate that its processing is complete (914). If the processing is complete, the transaction commits (908). If, on the other hand, the processing is not complete, the transaction continues processing (904).

Returning to 906, if the program indicates that it must block, the transaction aborted, and its thread is blocked in 910. The transaction is now in an inactive state waiting to be woken up by the scheduler 210. According to a described exemplary implementation, the blocked thread will be woken up when another transaction commits a write to a memory address that the blocked transaction read. Once such a write commits, the blocked transaction is instructed to wake (912) and retry processing from the beginning of the transaction (902).

Figure 10:
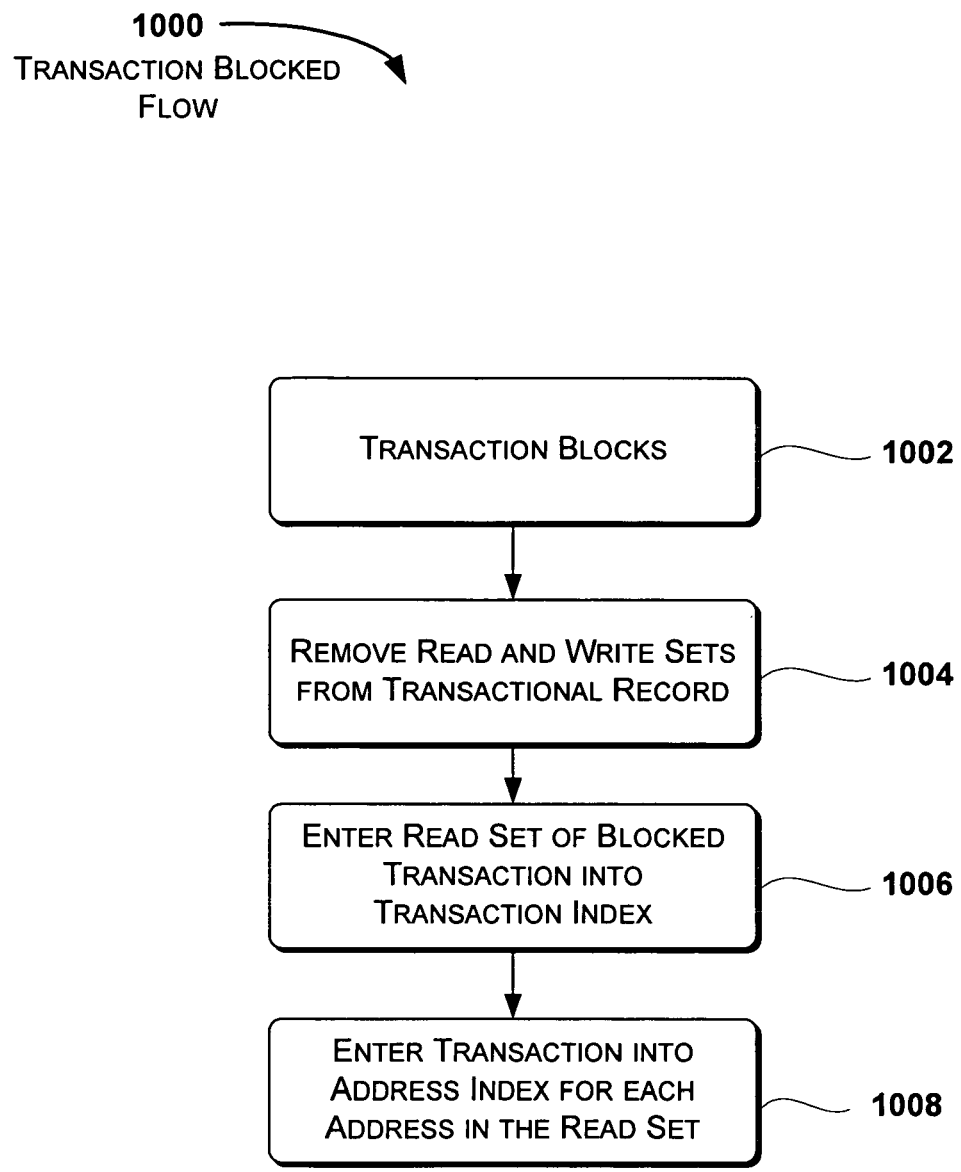
FIG. 10 is a flow diagram illustrating an exemplary implementation related to handling blocked transactions or threads.

FIG. 10 is a flow diagram illustrating how the thread manager 204 updates the transactional record 208 and the data structures 610 and 612 of the scheduler 210 when a transaction blocks. The exemplary process 1000 illustrated in FIG. 10 may be implemented using any suitable computing device, such as the computing device 100 illustrated in FIG. 1 and the various components illustrated in FIGS. 2-3.

The exemplary process 1000 begins when a transaction blocks (1002). At 1004, the thread manager 204 removes the transaction's read and write sets from the transactional record 208. At 1006, the scheduler 210 updates the transaction data structure 610 to include an entry for the newly blocked transaction that refers to the transaction's read set. At 1008, for each address in the transaction's read set, the scheduler 210 updates the address data structure 612 with a reference to the newly blocked transaction.

Figure 11:
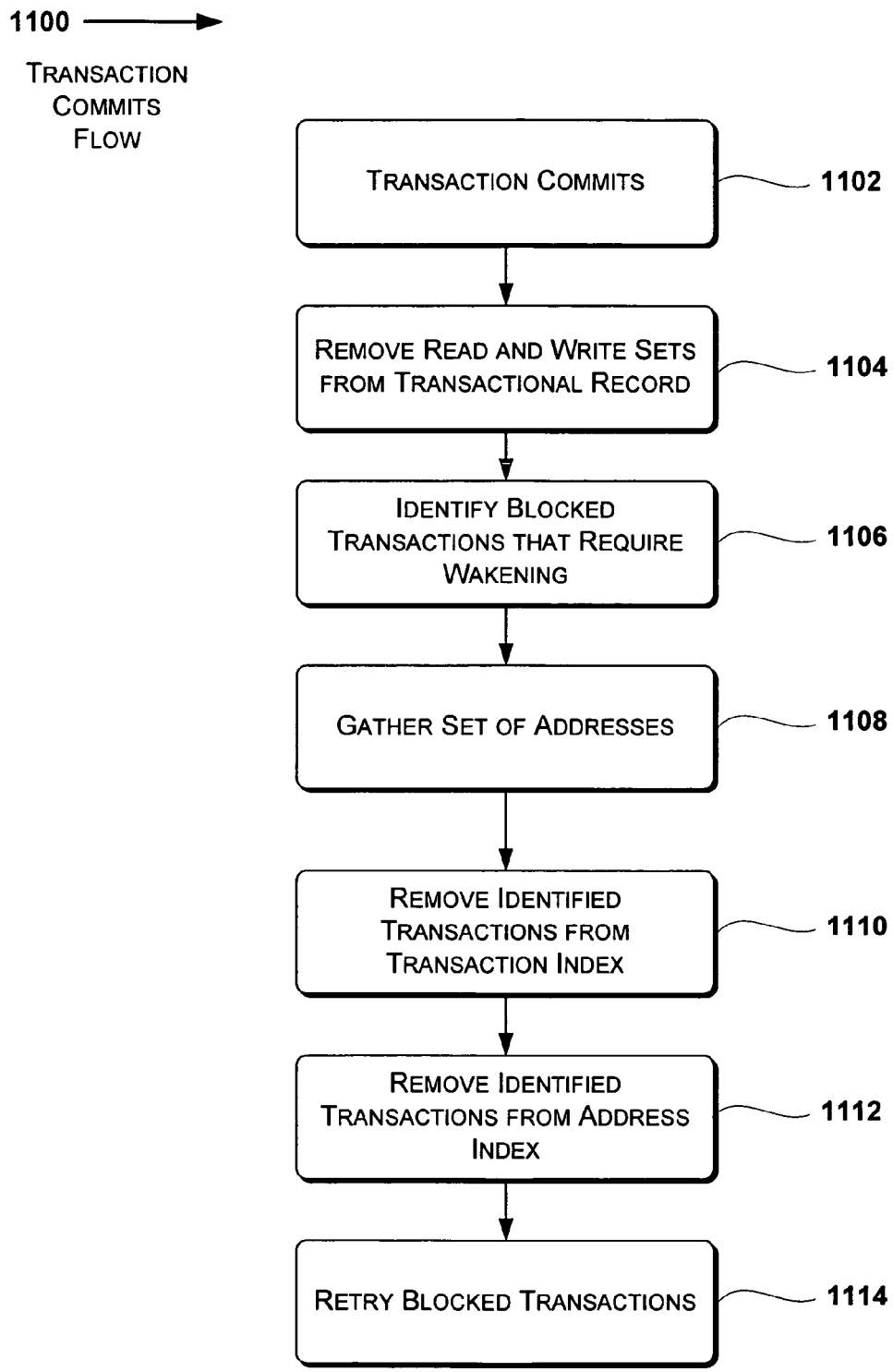
FIG. 11 is a flow diagram illustrating an exemplary implementation related to handling blocked transactions or threads after a transaction or thread commits.

FIG. 11 is a flow diagram illustrating how, when a transaction commits, the thread manager 204 updates the transactional record 208, updates the data structures of scheduler 210, and wakes blocked transactions. The exemplary process 1100 may be implemented using any suitable computing device, such as the computing device 100 illustrated in FIG. 1 and the various components illustrated in FIGS. 2-3.

The exemplary process 110 begins when a transaction commits (1102). At 1104, the thread manager 204 removes the transaction's read and write sets from the transactional record 208. At 1106, the scheduler 210 identifies which blocked transactions' read sets share an address with the committed transaction's write set. At 1108, the scheduler 210 gathers from the transaction data structure 610 the set of addresses referenced by the blocked transactions identified in 1106. At 1110, the blocked transactions identified at 1106 are removed from the transaction data structure 610. At 1112, the transactions identified at 1106 are removed from the address data structure 612 by reference to the set of addresses gathered at 1108. At 1114, the transactions identified at 1106 are scheduled for retry.

Heretofore, the invention has been described as a mechanism for blocking and restarting transactions; however, it may also be used to block and resume tasks. The distinction is that when a transaction's thread blocks (910), the transaction is aborted. By contrast, when a task's thread blocks, the task is committed.

CONCLUSION

The various data structures described in conjunction with the exemplary implementations may be modified as implementation requirements necessitate. For example, the transaction data structure 610 and the address data structure 612 may be combined to create a single data structure. The contents of the single data structure would be that same as the contents of data structures 610 and 612. The combined data structure would have a doubly-indexed searching facility, comprised of the indexes 702 and 704.

While example embodiments have been illustrated and described, it is to be understood that the invention is not limited to the precise configuration and resources described above. Various modifications, changes, and variations apparent to those skilled in the art may be made in the arrangement, operation, and details of the disclosed embodiments herein without departing from the scope of the claimed invention.

What is claimed is:

1. A method implemented by a computer device, the method comprising:
    determining a transaction of a first thread being executed is blocked from accessing a memory of the computing device by a second thread;
    waiting for at least one transaction of the second thread to commit;
    detecting that the at least one transaction has committed data to the memory, the at least one transaction having changed the content of the memory that the transaction of the first thread has been blocked from accessing, wherein the detecting includes (1) referring to an accessed address index of a doubly-indexed data structure that lists each memory address that is blocked from being accessed by the transaction of the first thread, and (2) referring to a blocked transaction index of the doubly-indexed data structure that indexes each blocked transaction and corresponding memory addresses of each blocked transaction;
    determining the memory is available based on the detecting that the at least one transaction has committed data to the memory;
    initiating execution of the blocked transaction of the first thread based on the determining that the memory is available, wherein the initiating includes first referencing the accessed address index to identify each memory location affected by the at least one committed transaction, and then rescheduling each blocked transaction in the blocked transaction index; and
    executing the blocked transaction of the first thread.

2. An article of manufacture for use in programming a processor, the article of manufacture comprising at least one computer readable storage device including at least one computer program embedded therein that causes the processor to perform the method of claim 1.

3. A method implemented by a computer device, the method comprising:
    accounting for blocked entities in a computer device, wherein each blocked entity is one of a thread, a thread transaction, or a task having one or more associated transactions; and
    retrying an execution of a blocked entity based on a reference to a doubly-indexed data structure, wherein:
        one index of the doubly-indexed data structure includes references identifying each of the blocked entities and corresponding memory addresses to be accessed by the respective blocked entity, and another index of the doubly-indexed data structure includes references to each memory location that each blocked entity attempted to access wherein blocking occurred; and
        a blocked entity is an entity blocked from accessing a memory address of the computer device due to the memory address being in use by a second entity,
    wherein the retrying includes referencing each of the two indexes of the doubly-indexed data structure before retrying the blocked entity: first referencing the another index to identify each memory location affected by a committed transaction, and then rescheduling each of the blocked entities in the one index of the doubly-indexed data structure that includes references identifying each of the blocked entities and corresponding memory addresses to be accessed by the respective blocked entity.

4. The method according to claim 3, further comprising building the doubly-indexed data structure from information associated with entities that are blocked.

5. The method according to claim 3, further comprising removing information from the doubly-indexed data structure before retrying the execution of the blocked entity.

6. The method according to claim 5, wherein the removing includes removing information related to a blocked entity, and if the removed information completely eliminates a blocked entity and information associated with the blocked entity, retrying the execution of the blocked entity.

7. An article of manufacture for use in programming a processor, the article of manufacture comprising at least one computer readable storage device including at least one computer program embedded therein that causes the processor to perform the method of claim 3.

8. A method implemented by a computer device, the method comprising:
    maintaining a data structure comprising:
        an index of entities blocked from accessing memory addresses of the computing device wherein each of the entities comprises a thread, a thread transaction, and a task having associated transactions, and wherein each entry of the index of entities comprises memory addresses corresponding to and affected by each respective blocking transaction; and
        an index of memory addresses, and corresponding blocked entities, that blocked entities attempted to access before being blocked;
    referencing the index of entities of the data structure to identify each memory location affected by a blocking transaction after the blocking transaction commits;
    rescheduling each of the blocked entities in the index of memory addresses of the data structure after the blocking transaction commits; and
    retrying an execution of the blocked entity following the referencing of the index of entities and the index of memory addresses.

9. The method according to claim 8, the method further comprising adding blocked entities to the data structure as entities are blocked, wherein each added entry in the index of entities corresponding to a blocked entity includes a reference to one or more memory addresses that necessitated blocking the blocked entity.

10. The method according to claim 8, the method further comprising adding entries corresponding to memory addresses to the index of memory addresses of the data structure as each entity is blocked, wherein each added memory address includes a reference to one or more blocked entities that attempted to access the added memory address before the blocked entity blocked.

11. An article of manufacture for use in programming a processor, the article of manufacture comprising at least one computer readable storage device including at least one computer program embedded therein that causes the processor to perform the method of claim 8.

12. The method according to claim 8, the method further comprising removing a blocked entity and corresponding memory addresses referenced by the blocked entity from the index of blocked entities and the index of memory addresses, respectively, as the blocked entity is identified for the retrying.

13. The method according to claim 12, the method further comprising retrying the execution of the blocked entity after removing the blocked entity and the corresponding memory addresses referenced by the blocked entity from, respectively, the index of blocked entities and the index of memory addresses.

14. The method according to claim 3, the method further comprising:
  adding memory addresses to the another index of the data structure as entities are blocked, wherein each added memory address includes a reference to one or more blocked entities that attempted to access the added memory address before the one or more blocked entities were blocked;
  referencing the doubly-indexed data structure after an entity commits to determine a benefit for the blocked entity to retry execution;
  removing information related to the blocked entity; and
  if the removed information completely eliminates the blocked entity and information associated with the blocked entity from the data structure, retrying the execution of the blocked entity.

15. The method according to claim 14, wherein the removing information related to the blocked entity includes removing, by a thread manager, any read transactions from a read transaction record and removing, by the thread manager, any write transactions from a write transaction record.

* * * * *